United States Patent
Gamaggio-Schäfer

[19]

[11] Patent Number: 6,122,804
[45] Date of Patent: Sep. 26, 2000

[54] METAL CABLE TIE

[76] Inventor: Krister Gamaggio-Schäfer, Sachsenhauser, Landwehrrweg 229, D-50598 Frankfurt/Main, Germany

[21] Appl. No.: 09/246,687

[22] Filed: Feb. 9, 1999

[30] Foreign Application Priority Data

Feb. 10, 1998 [DE] Germany ............... 198 05 062

[51] Int. Cl.[7] .................................................. B65D 63/00
[52] U.S. Cl. .............................. 24/25; 24/23 R; 24/20 R
[58] Field of Search ................... 24/21, 25, 268, 24/115 L, 136 A, 588, 20 R, 23

[56] References Cited

U.S. PATENT DOCUMENTS

| | | | |
|---|---|---|---|
| 3,015,865 | 1/1962 | Rapuzzi | 24/25 X |
| 4,366,602 | 1/1983 | Conlon et al. | 24/25 |
| 4,399,592 | 8/1983 | Chopp, Jr. et al. | |
| 5,291,637 | 3/1994 | Meyers | 24/25 |
| 5,732,446 | 3/1998 | Blanks | 24/25 |
| 5,850,674 | 12/1998 | Jansen | 24/21 |

FOREIGN PATENT DOCUMENTS

| | | |
|---|---|---|
| 834 707 | 3/1952 | Germany . |
| 25 53 046 | 8/1976 | Germany . |
| 26 06 736 | 9/1977 | Germany . |
| 2-186191 | 7/1990 | Japan . |
| 3-66906 | 3/1991 | Japan . |
| 3-234905 | 10/1991 | Japan . |
| 1 465 237 | 2/1977 | United Kingdom . |

*Primary Examiner*—Anthony Knight
*Assistant Examiner*—Robert J. Sandy
*Attorney, Agent, or Firm*—Oliff & Berridge, PLC

[57] ABSTRACT

A metal cable tie includes a tensioning strip and a head piece designed as a sheet metal part in the form of an elongate capsule with a tapering capsule cross section to receive a locking ball. The head piece includes at least one capsule wall being opposite the capsule bottom and designed to be elastically deflectable and provided with an opening for latching the locking ball in the latched position. A narrowed end of the capsule has an opening suitable for the insertion of a tool to push the locking ball out of the latching position.

9 Claims, 3 Drawing Sheets

METAL CABLE TIE

BACKGROUND OF THE INVENTION

1. Field of Invention

The invention relates to a metal cable tie. In particular, the invention relates to a metal cable tie that includes a flat metal strip, which may be placed around a cable or a cable bundle to be secured, and a head piece, located at one end of the metal strip through which the free end of the metal strip is pulled and locked.

2. Description of Related Art

In conventional metal cable ties, the head piece is designed as a metal capsule that forms a chamber that tapers conically opposite the direction in which the free end of the metal tie is pulled, and houses a locking ball. The locking ball is movable for a short distance in the chamber between a release position in an area of the chamber, in which the locking ball allows the metal strip to be pulled through the head, and a locking position in the narrower area of the chamber where the locking ball jams between the conical chamber wall and the metal strip and acts as a locking wedge to prevent the metal strip from sliding backward under the influence of a tensioning force acting on it.

A metal cable tie is disclosed in U.S. Pat. No. 4,399,592. The head piece is designed as a bent piece of sheet metal with a capsule part formed by deep drawing. The capsule part is open at the front and has a stamped tab that is bent after the locking ball is inserted to hold the ball in the capsule. One end of the metal strip is latched in the lower part of the head piece. The upper part of the head piece is formed by the capsule. The height of the capsule is just sufficient to receive the ball in the release position with the necessary play for movement. Further, the covering wall of the capsule expands conically in order to cooperate with the locking ball in a clamping fashion.

SUMMARY OF THE INVENTION

It is therefore an object of the invention to provide a metal cable tie in which the free end of the metal strip, after being pulled through, is locked in the head piece by the locking ball with considerable reliability, especially under the influence of vibrations, oscillations, temperature fluctuations, and other influences, but while also allowing the lock to be easily released when required.

As a result, in the metal cable tie according to the invention, the locking ball actually latches into a locking position, in contrast to the simple jamming of conventional cable ties.

BRIEF DESCRIPTION OF THE DRAWINGS

These and other aspects and advantages of the invention will become apparent from the following detailed description of exemplary embodiments when taken in conjunction with the accompanying drawings, in which like reference numerals designate like elements and wherein.

DETAILED DESCRIPTION OF PREFERRED EMBODIMENTS

While the invention will hereinafter be described in connection with exemplary embodiments thereof, it will be understood that it is not intended to limit the invention to those embodiments. On the contrary, it is intended to cover all alternatives, modifications and equivalents that may be included within the spirit and scope of the invention.

Figure 1:
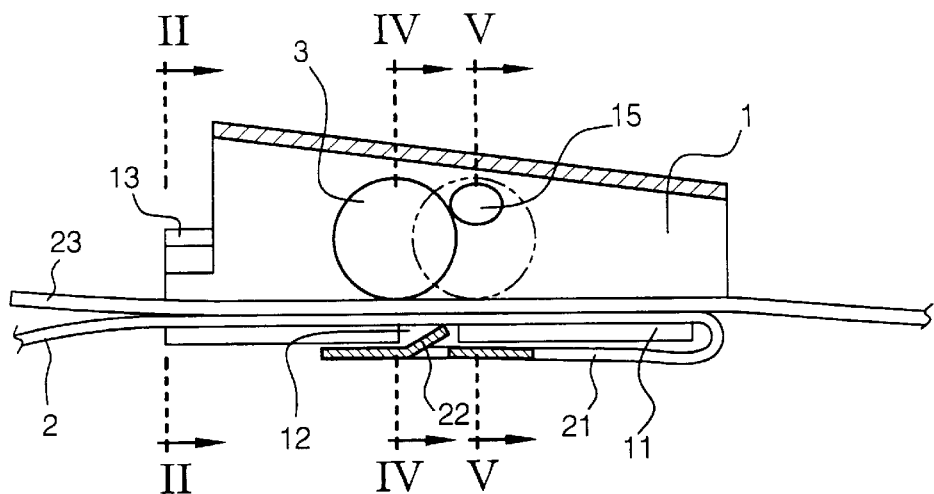
FIG. 1 is a cross-sectional view of the cable tie according to the invention in a lengthwise section.
Figure 2:
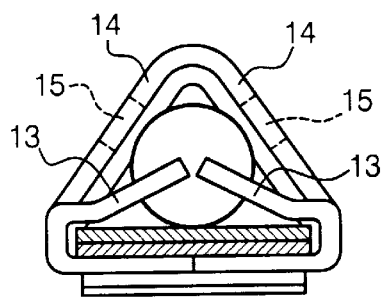
FIG. 2 is a cross-sectional view taken along plane II—II of FIG. 1 according to the invention.
Figure 3:
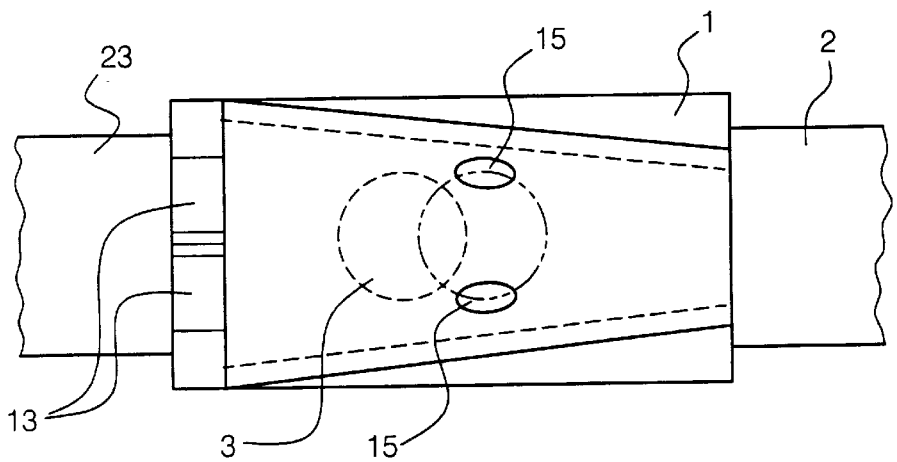
FIG. 3 is a top view of the cable tie according to the invention.

FIG. 1 shows the head piece 1 of the cable tie, stamped and bent as a sheet metal part, in lengthwise section with the metal tensioning strip 2 whose rear end 21 is bent around the bottom 11 of head piece 1. The metal tensioning strip 2 is bent by a stamped tab 22 into an opening 12 in the bottom 11 of the head piece and is thus secured in position. The front end 23 of tensioning strip 2 is pushed through head piece 1 over the bent rear end 21 of the tensioning strip. As shown in FIGS. 1 to 3, head piece 1 is designed as an elongate capsule with an approximately triangular cross section as shown in FIG. 2. The capsule tapers from the front, i.e., adjacent the plane II—II in FIG. 1, toward the rear in both height and width, as shown in FIG. 1 and FIG. 3. The capsule receives a locking ball 3. Two matching stamped and bent tabs 13 are located at the front end of the head piece, as shown in FIG. 2, so that they prevent the locking ball 3 from falling out at the front end. The rear end of the capsule is too narrow to allow locking ball 3 to escape.

As described above, the capsule for the locking ball 3 formed by head piece 1 is approximately triangular in cross section, as shown in FIG. 2, and has two side walls 14 in the shape of a saddle roof. The walls form two sides of a triangle, while the third side of the triangle is formed by bottom 11 of head piece 1. A bore 15 is located in each of the two side walls 14. These bores are both shown in FIGS. 1 to 3.

The operation of the cable tie according to the invention will now be explained in detail with reference to FIGS. 4–5, which show sections along planes IV—IV and V—V in FIG. 1.

Figure 4:
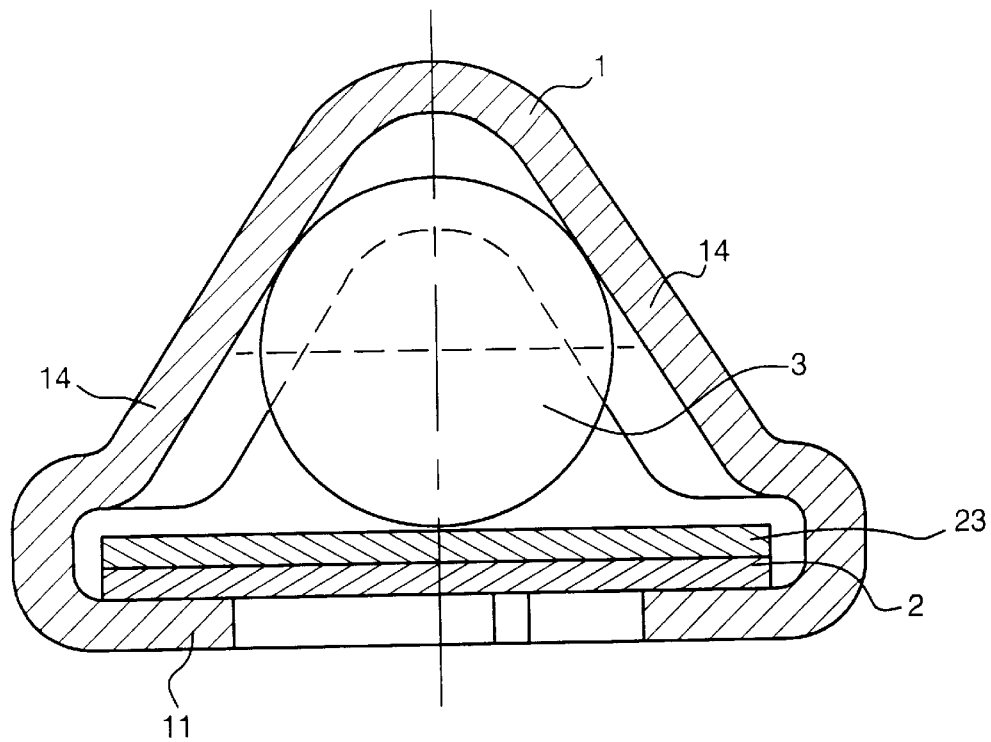
FIG. 4 is a cross-sectional view taken along plane IV—IV of FIG. 1 according to the invention.
Figure 5:
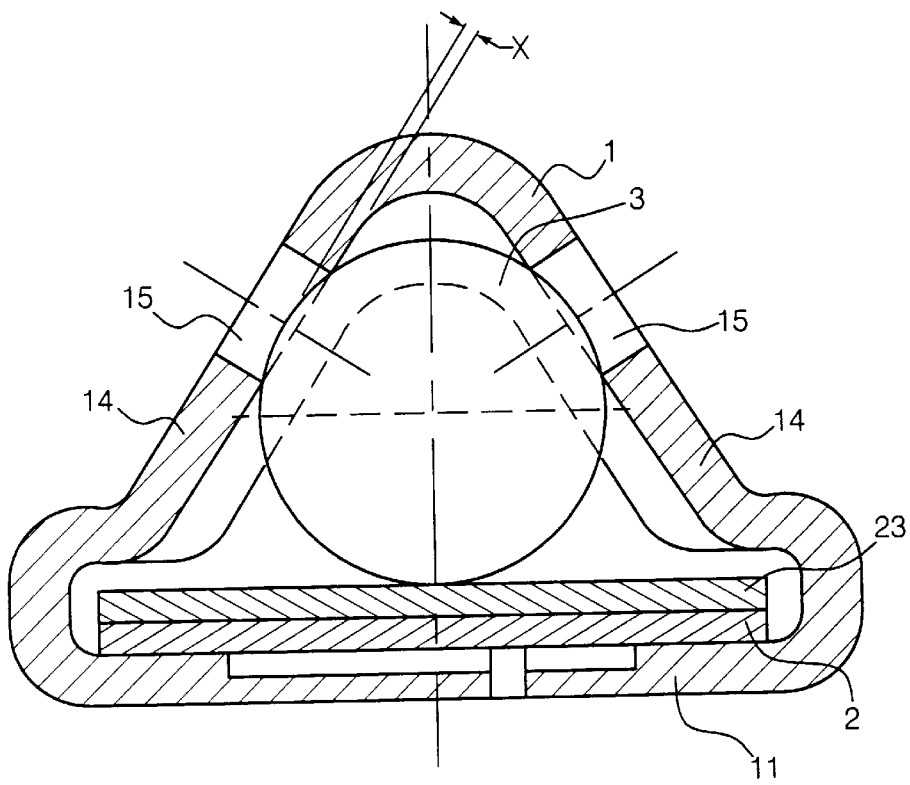
FIG. 5 is a cross-sectional view taken along plane V—V of FIG. 1 according to the invention.

FIG. 4 shows, in an enlarged cross section, the capsule formed by head piece 1, with locking ball 3 in a limiting position in which the locking ball already rests against the side walls 14 of head piece 1 and the top of the forward end 23 of the tensioning strip within the head piece.

Locking ball 3 is shown in the position in which it is sketched in FIG. 1 by solid and dashed lines. As shown in FIG. 1, the locking ball 3 shown as a solid line can move further forward in the capsule, i.e., in the direction of plane II—II, or in other words, toward the end of the capsule that is expanded further, i.e., the "expanded end." The ball 3 has freedom to move to the expanded end, so that the tightening strip 2 can be pulled through the head piece 1 by its forward end part 23 without significant resistance.

As a result of the position of locking ball 3 shown in FIG. 4, and with tightening strip 2 tightened, the strip 2 has a tendency to slide backward again out of head piece 1. However, the locking ball 3 is entrained by friction produced by contact against the above-described surfaces, and the ball is carried by the strip 2 as it slides backward until locking ball 3 produces a solid clamping action between the lateral capsule walls 14 and the top of the tensioning strip. As a result, further backward sliding of the tensioning strip is prevented because of the triangular geometry of the capsule formed by head piece 1. Also, side walls 14 can elastically bulge slightly. This makes it possible for the locking ball 32 to move backward until it latches by its lateral areas into the openings 15 formed in side walls 14. Thus, the locking ball 32 is locked in the clamping position. FIG. 5 shows the position of locking ball 3. FIG. 5 also shows the distance x by which the locking ball projects into the openings 15.

This locking of the locking ball in the locking position, as described above, is possible because of the elastic deformability of side walls 14. As a result, the locking ball does not become free from the release position as a result of vibrations, shaking, or other movements of the tensioned tensioning strip that could otherwise cause inadvertent backward sliding of the tensioning strip in the head piece and hence a release of the cable tie.

If the cable tie is to be released, locking ball 3 can be pushed out of its latching position with the aid of a screwdriver or another elongate object inserted through the open narrow end of the capsule, i.e., the end of the head piece positioned and facing away from plane II—II in FIG. 1. As a result, the tensioning strip can then be easily loosened and later latched again.

The safety tab 22 shown in FIG. 1 is positioned on the rear bent end of tensioning strip 2. The safety tab 22 engages end opening 12 of the capsule bottom 11. The safety tab 22 is preferably dimensioned and positioned so that is exerts a pressure against the tensioning strip 2 that runs over the capsule bottom and bends the tensioning strip 2 slightly upward at that point. This curvature can be pre-shaped in the course of the assembly of the cable binder in the tensioning strip. This produces an additional securing effect on the locking ball 3, because the locking ball 3 is pushed back by a small curvature into the latching position, as shown in FIG. 1, for example.

Figure 6:
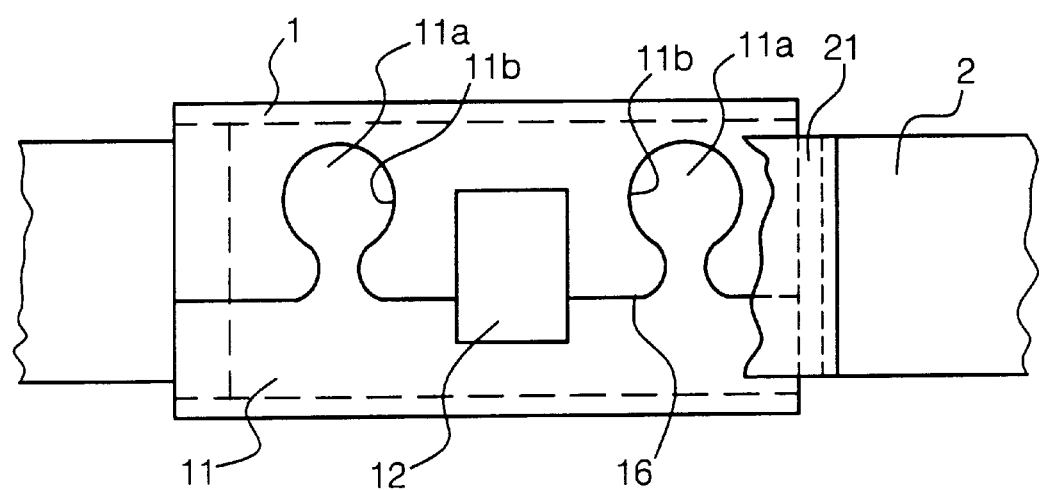
FIG. 6 is a bottom view of the cable tie according to the invention.

FIG. 6 shows a bottom view of the cable tie, with the rear end 21 of the tensioning strip 2 being broken away so that the design of bottom 11 of the capsule can be seen. The head piece 1 consists of a bent sheet metal part, with the gap 16 between the abutting edges of the sheet metal part extending in the lengthwise direction through the bottom 11. These two edges of the sheet metal, which abut one another, are fastened to one another. Tabs 11a are formed on one edge of the sheet metal and matching openings 11b are punched in the other edge of the sheet metal so that they are complementary in shape and engage one another. This ensures that the total geometry of the capsule cannot change even under the pressure exerted by locking ball 3 in the clamping position, thus ensuring a permanently reliable locking function.

Although the embodiment shown and described above is one exemplary design, it is also possible to use a cage design with an approximately rectangular or trapezoidal cross section that provides the same operation. In such a cage, the upper top wall runs from the front to the back, with the distance from the bottom growing smaller, and has a bore or opening similar to the openings 15 in the embodiment described above. This bore or opening serves to latch the locking ball in the clamping position.

While the invention has been described in conjunction with specific embodiments thereof, it is evident that many alternatives, modifications and variations may be apparent to those skilled in the art. Accordingly, the exemplary embodiments of the invention as set forth herein are intended to be illustrative, not limiting. Various changes may be made without departing from the spirit and scope of the invention.

What is claimed is:

1. A metal cable tie, comprising:

a metal tensioning strip having a rear end and a free end;

a head piece stamped from sheet metal and defining an elongated capsule, the capsule having a capsule bottom, opposing capsule walls joined to the capsule bottom, a first capsule end and a second capsule end opposing the first capsule end, the rear end of the tensioning strip being secured to the capsule bottom, the tensioning strip being able to be pushed by the free end through the capsule in a first lengthwise direction over the capsule bottom; and a locking ball received in the head piece, the tensioning strip being pullable in a second lengthwise direction opposite the first lengthwise direction, the capsule narrowing in the first lengthwise direction from a cross section, at the first capsule end, that receives the locking ball with play to a smaller cross section, at the second capsule end, that causes the locking ball to be clamped firmly between the tensioning strip rear end and the capsule walls opposing the tensioning strip rear end, the capsule has at the first capsule end at least one retainer that prevents the locking ball from falling out;

wherein the cross-sectional shape of the capsule allows a degree of elastic deflection of at least one of the capsule walls opposite the capsule bottom, the at least one capsule wall having an opening into which the locking ball can be latched in a clamping position with the free end of tensioning strip fed through the capsule and secured by the locking ball in the clamping position, the second capsule end having an opening that permits the introduction of a tool into the capsule to push the locking ball out of its clamping position.

2. The cable tie according to claim 1, wherein the capsule has an approximately triangular cross-sectional shape with the opposing capsule walls extending in the manner of a saddle roof over the capsule bottom, and an opening for latching the locking ball is formed in each of the opposing capsule walls.

3. The cable tie according to claim 1, wherein the capsule has at least one of an approximately rectangular cross-sectional shape and a trapezoidal cross-sectional shape, the capsule including two opposing capsule walls and a top wall that is opposite the capsule bottom, and the top wall extends diagonally relative to capsule bottom along the length of the capsule to reduce the cross section of the capsule from the first capsule end to the second capsule end, the top wall provided with an opening for latching locking ball.

4. The cable tie according to claim 1, wherein the first capsule end that has the larger cross section is blocked by the retainer, the retainer comprising tabs bent inward, the tabs being at least one of stamped or shaped, the tabs respectively positioned at corresponding ends of the capsule walls.

5. The cable tie according to claim 1, wherein the capsule bottom including a bottom opening, the bottom opening being a through opening, the rear end of the tensioning strip is guided through the head piece and is bent around the capsule bottom, the rear end of the tensioning strip engaging in a locking fashion in a capsule bottom opening by a tab formed by combined cutting and bending, the tab presses through the capsule bottom opening against a portion of the tensioning strip that extends over the capsule bottom inside the capsule.

6. The cable tie according to claim 1, wherein the head piece is bent to form a butt joint that runs through the capsule bottom of assembled edges of the stamped sheet metal part forming the head piece, the butt joint including at least one expanding tab on a one edge and a matching opening on an other edge, the butt joint at least one of formed and stamped in such a manner that a shapewise connection between the adjacent edges of the sheet metal is produced by a respective tab engaging a respective opening.

7. A cable tie comprising:

a tensioning strip having a rear end and a free end;

a head piece defining an elongated capsule, the capsule having a capsule bottom, opposing capsule walls joined to the capsule bottom, a first capsule end, and a second capsule end opposing the first capsule end, the tensioning strip having the rear end secured to the capsule bottom; and a locking ball received in the head piece, the capsule narrowing in a lengthwise direction from a cross section, at the first capsule end, that receives the locking ball with play to a smaller cross section, at the second capsule end, that causes the locking ball to be clamped firmly between the tensioning strip rear end and the capsule walls opposing the tensioning strip rear end, the capsule has at the first capsule end at least one retainer that prevents the locking ball from falling out;

wherein the cross-sectional shape of the capsule allows a degree of elastic deflection of at least one of the capsule walls opposite the capsule bottom, the at least one capsule wall having an opening into which the locking ball can be latched in a clamping position.

8. The cable tie according to claim 7, wherein the second capsule end having an opening that permits the introduction of a tool into the capsule to push the locking ball out of its clamping position.

9. The cable tie according to claim 7, wherein the capsule bottom including a through opening, the rear end of the tensioning strip is guided through the head piece and is bent around the capsule bottom, the rear end of the tensioning strip having a tab, the tab passing through the through opening against a portion of the tensioning strip that extends over the capsule bottom inside the capsule.

* * * * *